United States Patent [19]
Yamaguchi

[11] Patent Number: 6,137,536
[45] Date of Patent: Oct. 24, 2000

[54] SYNCHRONIZING SIGNAL GENERATOR

[75] Inventor: Kazunari Yamaguchi, Sapporo, Japan

[73] Assignee: Matsushita Electric Industrial Co., Ltd., Osaka, Japan

[21] Appl. No.: 09/284,751

[22] PCT Filed: Aug. 26, 1998

[86] PCT No.: PCT/JP98/03780

§ 371 Date: Apr. 20, 1999

§ 102(e) Date: Apr. 20, 1999

[87] PCT Pub. No.: WO99/12344

PCT Pub. Date: Mar. 11, 1999

[30] Foreign Application Priority Data

Aug. 29, 1997 [JP] Japan .................................. 9-234415

[51] Int. Cl.[7] .................................................. H04N 5/06
[52] U.S. Cl. ........................... 348/521; 348/524; 345/213
[58] Field of Search ................................. 348/521, 536, 348/540, 547, 550, 524, 525, 529, 531; 345/213

[56] References Cited

U.S. PATENT DOCUMENTS

| | | | |
|---|---|---|---|
| 4,639,280 | 1/1987 | Willis | 348/536 |
| 5,686,968 | 11/1997 | Vjiie et al. | 348/521 |
| 5,790,200 | 8/1998 | Tsujimoto et al. | 348/536 |

*Primary Examiner*—Victor R. Kostak
*Attorney, Agent, or Firm*—Wenderoth, Lind & Ponack, L.L.P.

[57] ABSTRACT

The present invention relates to processing of a video signal in a computer display and the like, and aims at providing a synchronizing signal generator which can obtain a vertical synchronizing pulse whose phase is stable with respect to the horizontal synchronizing signal and in which a counter for counting a clock synchronized with the horizontal synchronizing signal has a small counted value. It comprises a counter (8R) for detecting the vertical synchronization period (N) on the basis of the horizontal synchronizing signal (Hsync) and an output switching unit (14) which outputs a vertical synchronizing pulse (Vd) synchronized with the vertical synchronizing signal (Vsync) when the input vertical synchronizing signal (Vsync) has a vertical synchronization period of a given range, and which selects and outputs a pulse (Sq) having a given vertical synchronization period when the input vertical synchronizing signal does not have a vertical synchronization period of the given range.

6 Claims, 5 Drawing Sheets

SYNCHRONIZING SIGNAL GENERATOR

TECHNICAL FIELD

The present invention relates to a synchronizing signal generator used in equipment for processing a video signal displayed in video display equipment, such as a computer display and the like.

BACKGROUND ART

Before describing a conventional synchronizing signal generator by referring to FIG. 4 and FIG. 5, the role of the synchronizing signal generator in video display equipment will now be described briefly.

When displaying a video output from a video signal source such as a television, a video tape recorder, a computer, and the like as an image in video display equipment such as a television receiver, a computer display, and the like, it is important that the horizontal synchronizing signal and the vertical synchronizing signal included in the video signal outputted from such a video signal source be stable and synchronized with each other.

However, the periods and phases of the horizontal synchronizing signal and the vertical synchronizing signal vary due to various effects of the transmission path on which the video signal travels, operation of switching the input of the video signal, and the like. Such variations in the synchronizing signals make the video signal unstable. As a result, the image reproduced and displayed from the video signal becomes unstable and inferior in quality.

In order to solve the unstableness of the synchronizing signals due to the transmission path or input switch, the following measure has conventionally been taken on the side of the receiver receiving the input of the video signal from the video signal source. That is to say, stable horizontal and vertical synchronizing pulses serving as a reference of synchronization are generated in the receiver. These stable horizontal and vertical synchronizing pulses are respectively synchronized with the horizontal synchronizing signal Hsync and the vertical synchronizing signal Vsync included in the inputted video signal to stabilize the video signal. An image is displayed on the basis of the video signal thus stabilized.

For the generation of the synchronization-reference horizontal and vertical synchronizing pulses, a synchronizing signal generator of so-called horizontal and vertical countdown system is used, in which a counter driven on the basis of a reference clock is used to count the horizontal synchronization periods and vertical synchronization periods.

Figure 4:
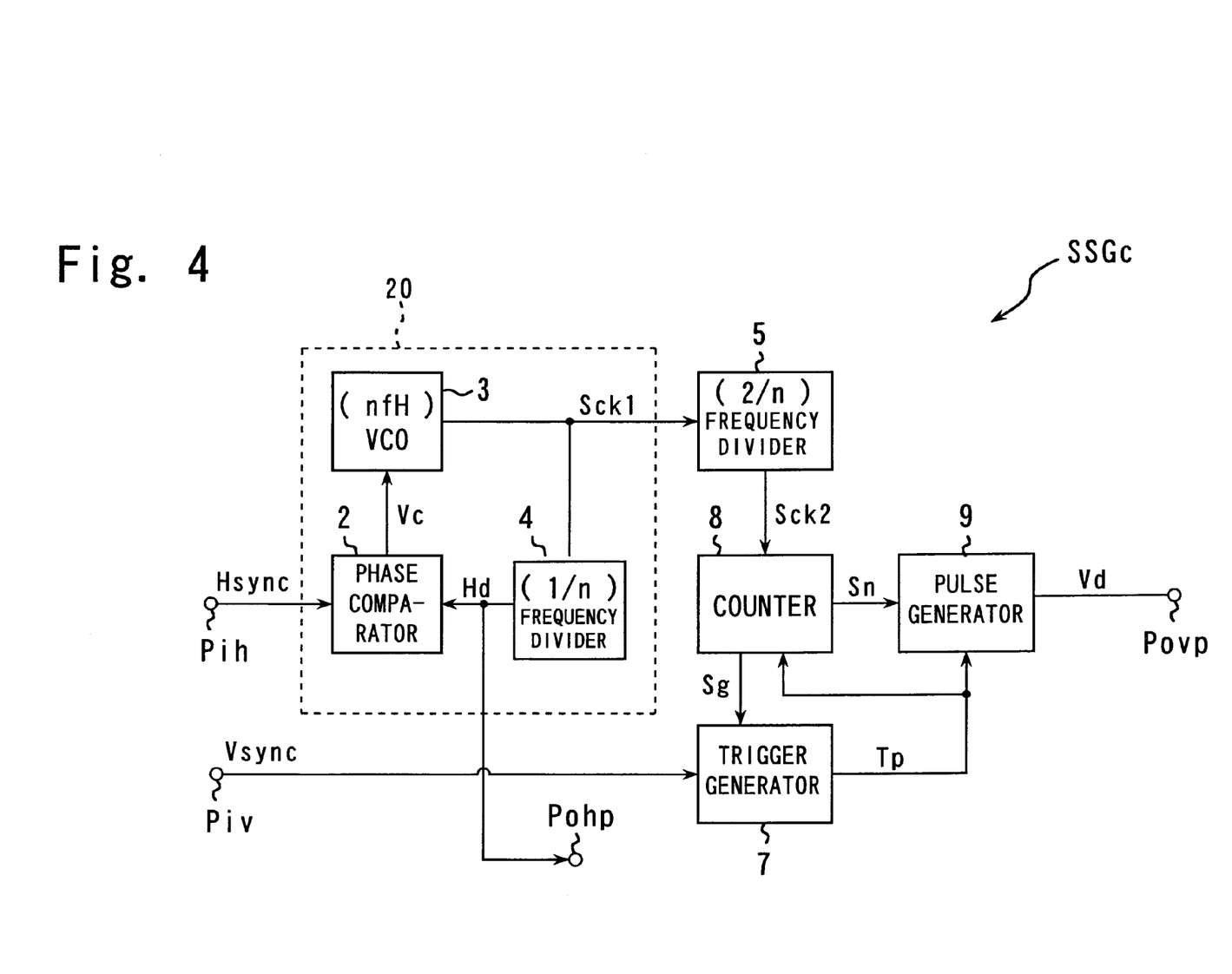
FIG. 4 is a block diagram showing the structure of a conventional synchronizing signal generator.

FIG. 4 shows a synchronizing signal generator of the horizontal and vertical countdown system used in a television receiver as an example of a conventional synchronizing signal generator. The synchronizing signal generator SSGc in this example has a first input port Pih, a second input port Piv, a phase comparator 2, a voltage-controlled oscillator (VCO) 3, a first frequency divider 4, a second frequency divider 5, a trigger generator 7, a counter 8, a pulse generator 9, a first output port Pohp, and a second output port Povp.

The input port Pih and the input port Piv are connected to an external video signal source (not shown) to respectively receive input of the horizontal synchronizing signal Hsync and the vertical synchronizing signal Vsync included in the video signal. The first frequency divider 4 generates an output wave whose frequency is 1/n of the input frequency, and the second frequency divider 5 generates an output wave of 2/n of the input frequency. That is to say, the division ratios of the first frequency divider 4 and the second frequency divider 5 are 1/n and 2/n, respectively. In this example, n is set to 32, and the division ratio of the frequency divider 4 is 1/32 and the division ratio of the frequency divider 5 is 1/16.

The phase comparator 2, the voltage-controlled oscillator 3, and the first frequency divider 4 are connected to each other to form a PLL circuit 20. The voltage-controlled oscillator 3 generates a first clock pulse Sck1 having a given frequency F (period P=1/F) on the basis of a voltage inputted from the phase comparator 2. The first frequency divider 4 divides the period of the clock pulse Sck1 inputted from the voltage-controlled oscillator 3 to 1/32 to output clock pulses having a frequency of F·32 (period H=1/(F·32)) as a horizontal synchronizing pulse Hd to the phase comparator 2 and the output port Pohp. The phase comparator 2 generates a control voltage Vc corresponding to the phase difference between the horizontal synchronizing signal Hsync inputted from the input port Pih and the horizontal synchronizing pulse Hd inputted from the frequency divider 4 and outputs the control voltage Vc to the voltage-controlled oscillator 3.

The voltage-controlled oscillator 3 generates the clock pulse Sck1 having the period P of 1/F and synchronized with the horizontal synchronizing signal Hsync on the basis of the control voltage Vc. Accordingly the horizontal synchronizing pulse Hd generated by dividing the first clock pulse Sck1 in the first frequency divider 4 is synchronized with the horizontal synchronizing signal Hsync and is locked to with the horizontal synchronizing signal Hsync.

The second frequency divider 5 is connected to the voltage-controlled oscillator 3 in the PLL circuit 20 to receive the input of the first clock pulse Sck1. The frequency divider 5 divides the period of the first clock pulse Sck1 to 1/16 to generate and output a second clock pulse ScK2 having the period of H/2 to the counter 8.

The period of the clock pulse ScK2 outputted from the second frequency divider 5 is set to H/2, i.e., its frequency is set to twice that of the horizontal synchronizing signal Hsync because of the following reason. In the case of NTSC system, for example, the number of scanning lines in two fields is an integer value of 525, and generating the vertical synchronizing pulse Vd in the same timing in even and odd fields requires being able to count 262.5 H=525·(H/2). That is to say, it is advantageous to set the period to H/2.

The trigger generator 7 is responsive to the vertical synchronizing signal Vsync inputted from the input port Piv to generate a trigger pulse tp. The counter 8 is connected to the trigger generator 7 to receive input of the trigger pulse tp and is also connected to the frequency divider 5 to receive input of the clock pulse ScK2. The counter 8 is reset by the trigger pulse tp and then counts pulses of the clock pulse ScK2 to generate a count signal Sn indicating the count value N.

The counter 8 generates a gate signal Sg which goes to a low level when its count value N attains a count value Nvp which is smaller than the count value Nv corresponding to one vertical synchronization period by a given number of pulses. This gate signal Sg returns from the low level to the high level at the time when the count value N is reset to zero by the trigger pulse tp. In this example, Nvp is set to Nv−1. That is to say, the gate signal Sg is kept at the low level in the period between the time Tnvp at which the count value N becomes from Nv−2 to Nv−1 and the time Trst at which the count value N is reset by the trigger pulse tp.

The trigger generator 7 is also connected to the counter 8 to receive input of the gate signal Sg. The gate of the trigger generator 7 is opened from the time Tnvp to the time Trst by the gate signal Sg. This prevents the count value N from being accidentally reset due to input of noise to the input port Piv during the counting operation of the counter 8.

The pulse generator 9 is connected to the trigger generator 7 to receive input of the trigger pulse tp and is also connected to the counter 8 to receive input of the count signal Sn. The pulse generator 9 is reset at the time when the trigger pulse tp is inputted to the pulse generator 9 from the trigger generator 7 and the vertical synchronizing pulse Vd then goes to the low level. The vertical synchronizing pulse Vd attains the high level at the time when the count value N of the counter 8 changes from one to two. Thus the pulse generator 9 generates the vertical synchronizing pulse Vd which is at the low level only in the period in which the count value N is zero and one, which is outputted from the output port Povp.

Although the pulse generator 9 is set to output the high level at the time when the count value N of the counter 8 changes from one to two in this example, the low level period of the vertical synchronizing pulse Vd can be optionally changed by changing the timing of going to the high level in accordance with another variation of the count value.

Next, referring to the timing chart shown in FIG. 5, operation of the above-described synchronizing signal generator SSGc will be described. In this diagram, the abscissa indicates passage of time t, and the ordinate indicates behaviors of the horizontal synchronizing signal Hsync, horizontal synchronizing pulse Hd, clock pulse ScK2, vertical synchronizing signal Vsync, trigger pulse tp, vertical synchronizing pulse Vd, count value N, and gate signal Sg at time points along the time axis t.

The horizontal synchronizing signal Hsync is updated at times t1, t3, t6 and t8. Each period between these times corresponds to one horizontal synchronization period H.

As stated above, the period of the horizontal synchronizing pulse Hd is synchronized and locked to the horizontal synchronizing signal Hsync, it is therefore updated at times t1, t3, t6, and t8, similarly to the horizontal synchronizing signal Hsync.

Since the period of the clock pulse ScK2 is H/2 as stated above, it is updated at times t1, t2, t3, t5, t6, t7, t8, and t10. That is to say, each period between these times corresponds to the half period H/2 of one horizontal synchronization period H.

For the vertical synchronizing signal Vsync, its one vertical synchronization period ends at time t4 in this example. That is to say, the count value N is Nv between time t3 and time t4. Accordingly, going back in time, the count value N between time t3 and time t2 is Nv−1 and the count value N between time t2 and time t1 is Nv−2. That is to say, the time t2 corresponds to the above-mentioned time Tnvp and the time t4 corresponds to the above-mentioned time Trst. The phase of the vertical synchronizing signal Vsync changes at time t4 delayed by a given time τ after time t3 at which the phase of the horizontal synchronizing signal Hsync changes. That is to say, the phases of the vertical synchronizing signal Vsync and the horizontal synchronizing signal Hsync are shifted by the time τ. This phase shift inevitably occurs due to various effects the video signal undergoes while traveling on the transmission path, effects of switch of input, and the like.

The trigger generator 7 generates the trigger pulse tp at time t4 in response to the vertical synchronizing signal Vsync.

The vertical synchronizing pulse Vd or the output from the pulse generator 9 changes from the high level to the low level with the input of the trigger pulse tp at time t4. The vertical synchronizing pulse Vd changes from the low level to the high level at time t6 at which the count value N of the counter 8 changes from one to two here. Thus the vertical synchronizing pulse Vd generated is at the low level in the period To from time t4 to time t6 in which the count value N is at zero and one, which is outputted from the output port Povp.

In this example, the pulse generator 9 is set to output the high level at the time when the count value N of the counter 8 changes from one to two. However, the low level period To of the vertical synchronizing pulse Vd can optionally be changed by changing the timing of going to the high level in accordance with another variation of the count value.

Figure 5:
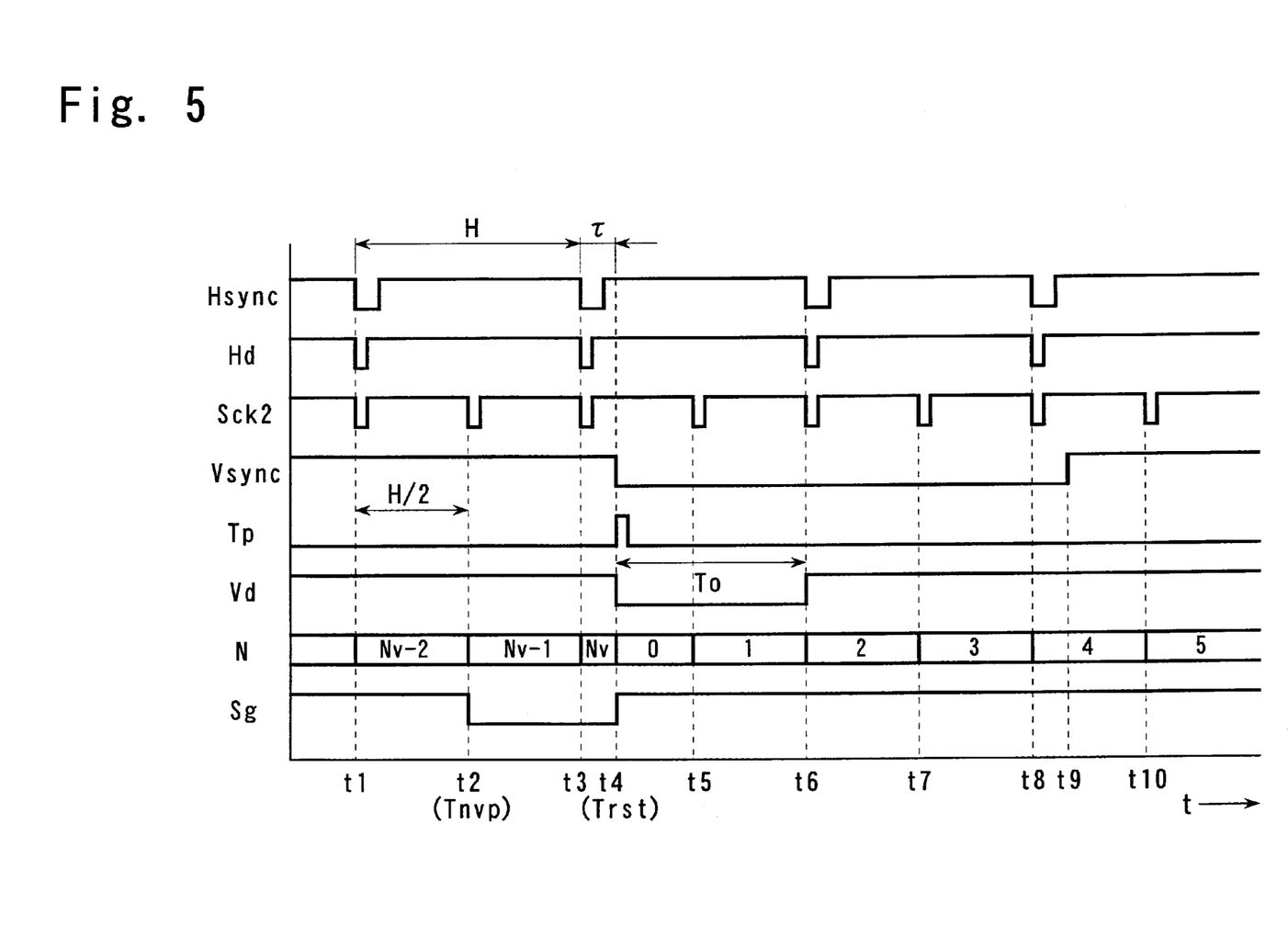
FIG. 5 is a timing chart showing operation of the synchronizing signal generator shown in FIG. 4.

However, in the conventional synchronizing signal generator shown as an example in FIGS. 4 and 5, the counter 8 must be able to count up to the value more than twice the scanning lines per one field to count the clock pulses having a period of ½ of the horizontal synchronization period H. That is to say, a counter with a larger counted value must be used as the counter 8 as the video signal has a larger number of scanning lines. For example, when one field contains 1200 or more scanning lines as in the case of a computer display, the counter 8 is required to be able to count a value twice that, i.e., 2400 or larger. Generally, as the counted value of a counter becomes larger, operating the circuit at high speed becomes more difficult. Accordingly it is very difficult to realize the synchronizing signal generator with digital LSIs requiring high-speed operation.

The horizontal synchronizing signal Hsync inputted from the input terminal Pih and the horizontal synchronizing pulse Hd outputted from the output port Pohp are controlled by the PLL circuit 20 so that they are synchronized with each other and locked thereto. However, the vertical synchronizing pulse Vd and the horizontal synchronizing pulse Hd respectively outputted from the output ports Povp and Pohp are not always in phase. That is to say, as the counter 8 is reset by the trigger pulse tp generated from the trigger generator 7 in response to the vertical synchronizing signal Vsync, the vertical synchronizing pulse Vd or the output from the pulse generator 9 goes to the low level. Further, when the count value N of the counter 8 attains a given value (in this example, at the time when it changes from one to two), the output of the pulse generator 9 attains the high level.

Accordingly, the phase of the vertical synchronizing pulse Vd does not agree with the phase of the horizontal synchronizing signal Hsync and the horizontal synchronizing pulse Hd due to the phase shift τ between the vertical synchronizing signal Vsync and the horizontal synchronizing signal Hsync caused by effects of the transmission path, switch of input, and the like, and they are kept shifted by the given time τ. As a result, the low-level period To of the vertical synchronizing pulse Vd also varies in accordance with the variation of the phase shift time τ. Hence, when this vertical synchronizing signal generator is used in a display device such as a liquid-crystal display device, for example, the display device cannot be driven properly.

An object of the present invention is to provide a synchronizing signal generator which can obtain a vertical synchronizing pulse having a phase stable with respect to the horizontal synchronizing signal and which can suppress the counted value of the counter.

DISCLOSURE OF THE INVENTION

A first aspect of the present invention is directed to a synchronizing signal generator for generating a vertical synchronizing pulse synchronized with a vertical synchronizing signal in an input video signal on the basis of a horizontal synchronizing signal in the input video signal, comprising:

a first clock signal generator for generating a first clock signal synchronized with the horizontal synchronizing signal;

a counter for counting the first clock signal to detect a vertical synchronization period of the vertical synchronizing signal;

a vertical synchronization period detector for detecting a period in which the input vertical synchronizing signal has the vertical synchronization period on the basis of the detected vertical synchronization period; and a vertical synchronizing pulse generator for, when the input vertical synchronizing signal has a vertical synchronization within a first given period range of the detected vertical synchronization period, outputting a vertical synchronizing pulse synchronized with the vertical synchronizing signal, and when the input vertical synchronizing signal does not have a vertical synchronization within the first given period range, generating a vertical synchronizing pulse having a second given vertical synchronization period;

thereby keeping the input horizontal synchronizing signal and the vertical synchronizing pulse constant in phase.

As stated above, according to the first aspect of the present invention, the vertical synchronization period is detected on the basis of the first clock signal synchronized with the horizontal synchronizing signal. One of the actual vertical synchronizing signal and a self-generated pulse signal is selected to compose a vertical synchronizing pulse in accordance with presence/absence of vertical synchronization of the vertical synchronizing signal actually inputted in the detected vertical synchronization period. Thus the vertical synchronizing pulse synchronized with the vertical synchronizing signal can be generated even if the vertical synchronizing signal is not inputted actually.

According to a second aspect of the present invention, in the first aspect of the invention, the vertical synchronizing pulse generator comprises a count reset unit for resetting the count value of the counter in accordance with the vertical synchronizing pulse, and a switching unit for selecting the input vertical synchronizing signal when the count value is larger than one vertical synchronization period by a given value, and selecting the vertical pulse in other circumstances, and wherein the vertical synchronizing pulse is generated by combining the vertical synchronizing signal and the vertical pulse in an alternative manner.

As stated above, according to the second aspect of the invention, the vertical synchronizing pulse is fed back to the counter for detecting the vertical synchronization period, thus preventing the generated vertical synchronizing pulse from shifting with respect to the vertical synchronizing signal.

According to a third aspect of the present invention, in the second aspect of the invention, the first clock signal generator comprises, a first clock pulse generator for generating a first clock pulse having a period which is 1/n times that of the input horizontal synchronizing signal, n being an integer, a first frequency divider for dividing the first clock pulse to 1/n to generate the first clock signal, and a phase comparator for detecting a phase difference between the first clock signal and the horizontal synchronizing signal to control the first clock pulse generator, wherein the counter counts pulses of the first clock signal having the same period as that of the horizontal synchronizing signal.

As stated above, according to the third aspect of the present invention, it is possible to suppress the counted value of the counter, since it counts pulses of the first clock signal having the same period as the horizontal synchronizing signal.

According to a fourth aspect of the present invention, in the second aspect of the invention, the synchronizing signal generator further comprises a second frequency divider for dividing the first clock pulse to 2/n to generate a second clock pulse having a period equal to ½ of the horizontal synchronization period, a delay unit for delaying the second clock pulse to generate a third clock pulse, and a hold unit for holding the output from the switching unit in accordance with the third clock pulse.

According to a fifth aspect of the present invention, in the second aspect of the invention, the synchronizing signal generator further comprises a switching controller for controlling the selection made by the switching unit between the input vertical synchronizing signal and the vertical pulse on the basis of the count value and the vertical synchronizing pulse, wherein the switching controller controls the switching unit to select the vertical synchronizing signal in a period from a time at which the horizontal synchronizing pulse is inputted with the vertical synchronizing pulse being low to a given time.

A sixth aspect of the present invention is directed to a synchronizing signal generating method for generating a vertical synchronizing pulse synchronized with a vertical synchronizing signal in an input video signal on the basis of a horizontal synchronizing signal in the input video signal, comprising:

a first clock signal generating step of generating a first clock signal synchronized with the horizontal synchronizing signal;

a counting step of counting the first clock signal to detect a vertical synchronization period of the vertical synchronizing signal;

a vertical synchronization period detecting step of detecting a period in which the input vertical synchronizing signal has the vertical synchronization period on the basis of the detected vertical synchronization period; and a vertical synchronizing pulse generating step of, when the input vertical synchronizing signal has a vertical synchronization within a first given period range of the detected vertical synchronization period, outputting a vertical synchronizing pulse synchronized with the vertical synchronizing signal, and when the input vertical synchronizing signal does not have a vertical synchronization within the first given period range, generating a vertical synchronizing pulse having a second given vertical synchronization period;

thereby keeping the input horizontal synchronizing signal and the vertical synchronizing pulse constant in phase.

As stated above, according to the sixth aspect of the invention, the vertical synchronization period is detected on the basis of the first clock signal synchronized with the horizontal synchronizing signal. One of the actual vertical synchronizing signal and a self-generated pulse signal is selected to compose the vertical synchronizing pulse in accordance with presence/absence of vertical synchronization of the vertical synchronizing signal actually inputted in the detected vertical synchronization period. The vertical synchronizing pulse synchronized with the vertical synchronizing signal can be generated even if the vertical synchronizing signal is not actually inputted.

According to a seventh aspect of the present invention, in the sixth aspect of the invention, the vertical synchronizing pulse generating step comprises a count reset step of resetting the count value of the counting step in accordance with the vertical synchronizing pulse, and a switching step of selecting the input vertical synchronizing signal when the count value is larger than one vertical synchronization period by a given value, and selecting the vertical pulse in other circumstances, and the vertical synchronizing pulse is generated by combining the vertical synchronizing signal and the vertical pulse in an alternative manner.

As stated above, according to the seventh aspect of the invention, the vertical synchronizing pulse is fed back to the counter for detecting the vertical synchronization period, thus preventing the generated vertical synchronizing pulse from shifting with respect to the vertical synchronizing signal.

According to an eighth aspect of the present invention, in the seventh aspect of the invention, the first clock signal generating step comprises, a first clock pulse generating step of generating a first clock pulse having a period which is 1/n times that of the input horizontal synchronizing signal, n being an integer, a first frequency dividing step of dividing the first clock pulse to 1/n to generate the first clock signal, and a phase comparing step of detecting a phase difference between the first clock signal and the horizontal synchronizing signal, wherein the first clock pulse generating step generates the first clock pulse on the basis of the detected phase difference and the counting step counts pulses of the first clock signal having the same period as that of the horizontal synchronizing signal.

As stated above, according to the eighth aspect of the invention, the counted value of the counter can be suppressed, since it counts the pulses of the first clock signal having the same period as the horizontal synchronizing signal.

According to a ninth aspect of the present invention, in the seventh aspect of the invention, the synchronizing signal generating method further comprises, a second frequency dividing step of dividing the first clock pulse to 2/n to generate a second clock pulse having a period equal to ½ of the horizontal synchronization period, a delay step of delaying the second clock pulse to generate a third clock pulse, and a holding step of holding the output from the switching step in accordance with the third clock pulse.

According to a tenth aspect of the present invention, in the seventh aspect of the invention, the synchronizing signal generating method further comprises a switching control step of controlling the selection made in the switching step between the input vertical synchronizing signal and the vertical pulse on the basis of the count value and the vertical synchronizing pulse, wherein the switching control step controls the switching step to select the vertical synchronizing signal in a period from a time at which the horizontal synchronizing pulse is inputted with the vertical synchronizing pulse being low to a given time (Nv−1).

As described above, the synchronizing signal generator of this invention outputs a vertical synchronizing pulse synchronized with the vertical synchronizing signal only when the input vertical synchronizing signal has a vertical synchronization period of a given range. When the input vertical synchronizing signal does not have the given vertical synchronization period, the synchronizing signal generator generates a vertical synchronizing pulse having a given vertical synchronization period by itself to keep the input horizontal synchronizing signal and said vertical synchronizing pulse constant in phase. This provides a vertical synchronizing pulse which is stable in phase with respect to the horizontal synchronizing signal, with a counter counting to a small count value.

BEST MODES FOR CARRYING OUT THE INVENTION

Figure 1:
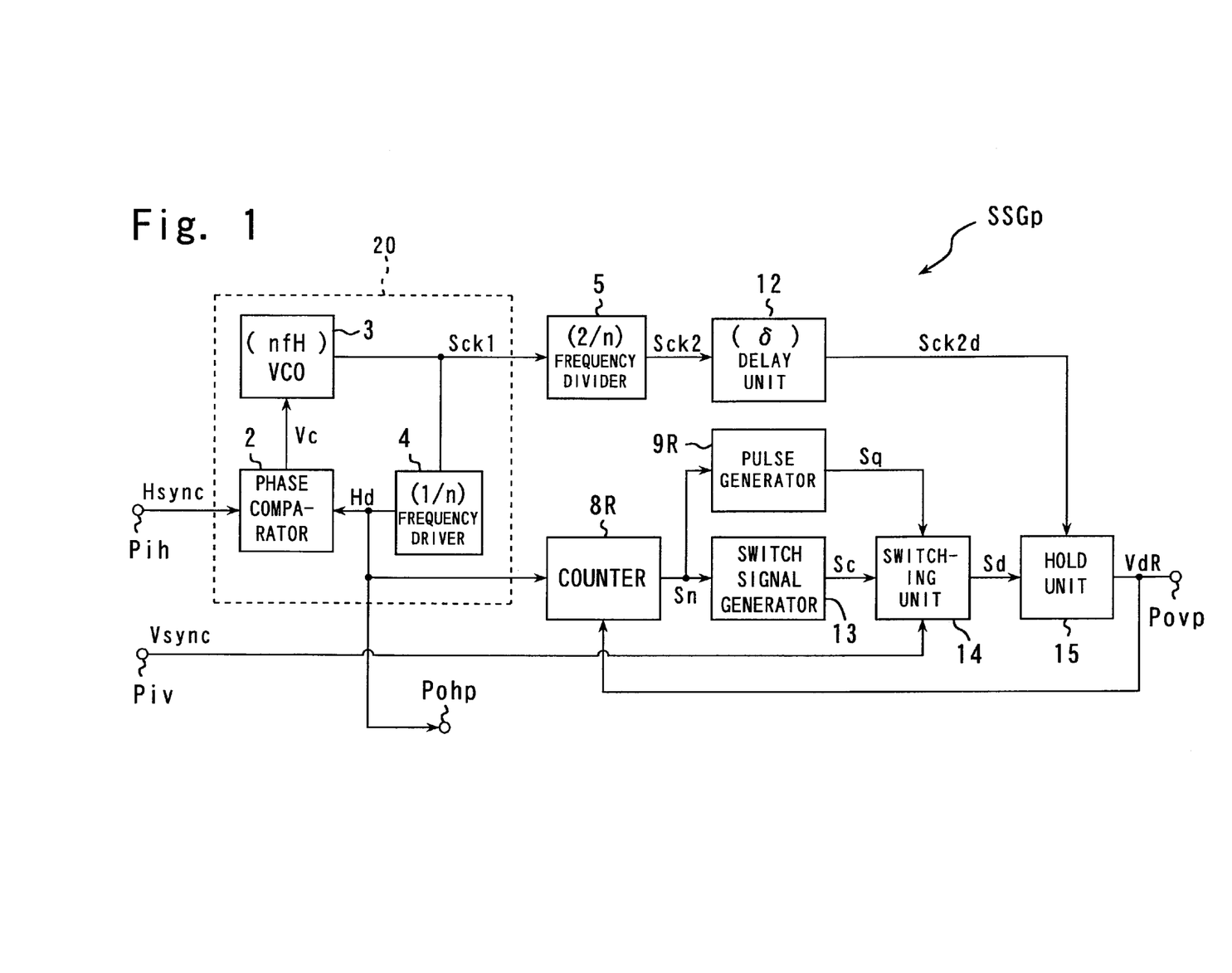
FIG. 1 is a block diagram showing the structure of a synchronizing signal generator according to an embodiment of the present invention.

Referring to FIG. 1, the structure of a synchronizing signal generator according to an embodiment of the present invention will now be described. After that, the operation of the synchronizing signal generator will be described in detail, referring to FIGS. 2 and 3.

As shown in FIG. 1, the synchronizing signal generator SSGp of this embodiment has a first input port Pih, a second input port Piv, a phase comparator 2, a voltage-controlled oscillator (VCO) 3, a first frequency divider 4, a second frequency divider 5, a counter 8R, a pulse generator 9R, a delay unit 12, a switch signal generator 13, a switching unit 14, a hold unit 15, a first output port Pohp, and a second output port Povp.

The input port Pih and the input port Piv are connected to an external video signal source (not shown) to respectively receive input of the horizontal synchronizing signal Hsync and the vertical synchronizing signal Vsync included in the video signal. The first frequency divider 4 generates an output wave whose frequency is 1/n of the input frequency, and the second frequency divider 5 generates an output wave of 2/n of the input frequency. That is to say, the division ratios of the first frequency divider 4 and the second frequency divider 5 are 1/n and 2/n, respectively. In this example, n is set to 32, and the division ratio of the frequency divider 4 is 1/32 and the division ratio of the frequency divider 5 is 1/16. Needless to say, the value of n is not limited to 32.

The phase comparator 2, the voltage-controlled oscillator 3, and the first frequency divider 4 are connected to each other to form a PLL circuit 20. The voltage-controlled oscillator 3 generates a first clock pulse Sck1 having a given frequency F (period P=1/F) on the basis of a voltage inputted from the phase comparator 2. The first frequency divider 4 divides the period of the clock pulse Sck1 inputted from the voltage-controlled oscillator 3 to 1/32 to output clock pulses having a frequency of F·32 (period H=1/(F·32)) as a horizontal synchronizing pulse Hd to the phase comparator 2 and the output port Pohp. The phase comparator 2 generates a control voltage Vc corresponding to the phase difference between the horizontal synchronizing signal Hsync inputted from the input port Pih and the horizontal synchronizing pulse Hd inputted from the frequency divider 4 and outputs the control voltage Vc to the voltage-controlled oscillator 3.

The voltage-controlled oscillator 3 generates the clock pulse Sck1 having the period P of 1/F and synchronized with the horizontal synchronizing signal Hsync on the basis of the control voltage Vc. Accordingly the horizontal synchronizing pulse Hd generated from the first frequency divider 4 by dividing the first clock pulse Sck1 is synchronized with the horizontal synchronizing signal Hsync and is locked to the horizontal synchronizing signal Hsync.

The second frequency divider 5 is connected to the voltage-controlled oscillator 3 in the PLL circuit 20 to receive the input of the first clock pulse Sck1. The frequency divider 5 divides the period of the first clock pulse Sck1 to 1/16 to generate and output a second clock pulse ScK2 having the period of H/2 to the delay unit 12.

The period of the clock pulse ScK2 outputted from the second frequency divider 5 is set to H/2, i.e., its frequency is twice that of the horizontal synchronizing signal Hsync because of the following reason. In the case of NTSC system, for example, the number of scanning lines in two fields is an integer value of 525, and generating the vertical synchronizing pulse Vd in the same timing in even and odd fields requires being able to count 262.5 H=525·(H/2). That is to say, it is advantageous to set the period to H/2.

The delay unit 12 is connected to the frequency divider 5 to delay the coming clock pulse ScK2 by a given time δ to generate a delayed clock pulse ScK2d.

The counter 8R is connected to the first frequency divider 4 in the PLL circuit 20 to receive input of the horizontal synchronizing pulse Hd. The counter 8R counts the pulses of the horizontal synchronizing pulse Hd to produce a count signal Sn indicating the count value N. The counter 8R is also connected to the hold unit 15 described later to receive input of a vertical synchronizing pulse VdR. The counter 8R is structured so that the count value N is reset when the horizontal synchronizing pulse Hd is provided with the vertical synchronizing pulse VdR at the low level. After reset, the counter 8R sequentially counts the output pulses Hd from the first frequency divider 4 from the reset count value N.

The pulse generator 9R is connected to the counter 8R to receive input of the count signal Sn. The pulse generator 9R generates a pulse signal Sq, which is at the low level only in a period in which the count value N of the counter 8R is larger by one count than the count value Nv corresponding to one vertical synchronization period, i.e., in the period in which the count value N is Nv+1, and which is at the high level in the remaining period.

The switch signal generator 13 is connected to the counter 8R and generates a binary flag signal Sc on the basis of the coming count signal Sn; the flag signal Sc is at the low level in the period from when the count value N attains a count value shortly preceding the count value Nv corresponding to one vertical synchronization period (in this example, Nv−1) to when the count value is at Nv, and it is at the high level in the remaining period.

The switching unit 14 is connected to the switch signal generator 13 to receive input of the flag signal Sc and is also connected to the pulse generator 9R to receive input of the pulse signal Sq. The switching unit 14 is also connected to the input port Piv to receive input of the vertical synchronizing signal Vsync. Usually, that is, when the flag signal Sc is at the high level, the switching unit 14 selects the output from the pulse generator 9R or the pulse signal Sq and outputs it as a vertical pulse signal Sd. When the switch signal Sc is at the low level, it selects the vertical synchronizing signal Vsync coming from the input port Piv and outputs it as the vertical pulse signal Sd. As mentioned above, the switching unit 14 selectively outputs one of the pulse signal Sq and the vertical synchronizing signal Vsync on the basis of the flag signal Sc outputted from the switch signal generator 13 to compose the vertical pulse signal Sd. In this sense, the flag signal Sc is a switch signal for switching between the pulse signal Sq and the vertical synchronizing signal Vsync as two element signals for composing the vertical pulse signal Sd.

The hold unit 15 is connected to the delay unit 12 to receive input of the delayed clock pulse Sck2d and is also connected to the switching unit 14 to receive input of the composite vertical pulse signal Sd. The hold unit 15 samples and holds the vertical pulse signal Sd in response to the delayed clock pulse Sck2d and outputs it as the vertical synchronizing pulse VdR. In this way, the pulse signal Sq produced in the pulse generator 9R and the original vertical synchronizing signal Vsync are selected in an alternative way in accordance with the count value N which the counter 8R provides by counting the horizontal synchronizing pulse Hd synchronized with the horizontal synchronizing signal Hsync to produce the vertical synchronizing pulse VdR synchronized with the horizontal synchronizing pulse Hd (or the horizontal synchronizing signal Hsync) and the vertical synchronizing signal Vsync.

Next, referring to the timing chart shown in FIG. 2, the operation of the above-described synchronizing signal generator SSGp will be described. In this diagram, the abscissa shows passage of time t and the ordinate shows behaviors of the horizontal synchronizing signal Hsync, horizontal synchronizing pulse Hd, clock pulse ScK2, delayed clock pulse ScK2d, vertical synchronizing signal Vsync, switch signal Sc, pulse signal Sq, vertical pulse signal Sd, vertical synchronizing pulse VdR, and count value N, at time points along the time axis t.

The horizontal synchronizing signal Hsync is updated at times t1, t3, t6, and t8. Each period between these times corresponds to one horizontal synchronization period H.

Since the period of the horizontal synchronizing pulse Hd is synchronized and locked to the horizontal synchronizing signal Hsync as stated above, it is updated at times t1, t3, t6, and t8.

The period of the clock pulse ScK2 is H/2 as stated above, and therefore it is updated at times t1, t2, t3, t5, t6, t7, t8, and t10. Each period between these times, or the period of the clock pulse ScK2 corresponds to the half period H/2 of one horizontal synchronization period H.

Since the delayed clock pulse ScK2d is delayed by time δ after the clock pulse ScK2, it is updated at times t1d, t2d, t3d, t5d, t6d, t7d, t8d, and t10d, respectively delayed by time δ after the times t1, t2, t3, t5, t6, t7, t8, and t10. FIG. 2 only shows the times t1*d*, t3*d*, and t6*d* for simplicity.

One vertical synchronization period of the vertical synchronizing signal Vsync ends at time t4 in this example. The phase of the vertical synchronizing signal Vsync changes at time t4 delayed by a given time τ after time t3 at which the phase of the horizontal synchronizing signal Hsync changes. That is to say, the vertical synchronizing signal Vsync and the horizontal synchronizing signal Hsync are shifted in phase by the time τ. This phase shift inevitably occurs due to various effects the video signal undergoes while traveling on the transmission path, effects of switching of input and the like.

As stated above, the count value N of the counter 8R is reset when the horizontal synchronizing pulse Hd is provided with the vertical synchronizing pulse VdR at the low level, and therefore the count value N is reset at time t6 from Nv to zero. Thus the count value N is incremented at times t1, t3, and t8 in synchronization with the pulse periods of the horizontal synchronizing pulse Hd before and after time t6.

As stated above, the switch signal Sc or the output from the switch signal generator 13 is at the low level in the period between time t1 at which the count value N of the counter 8 reaches the count value Nvp shortly before the count value Nv corresponding to one vertical synchronization period (In this example, Nvp=Nv−1) and time t6 at which the count value N is reset, and it is at the high level in the remaining period.

As stated above, the switching unit 14 is switched to select and output the vertical synchronizing signal Vsync from the input port Piv while the switch signal Sc from the counter 8R is at the low level, and to select and output the switch signal Sc in the remaining period. As a result, it generates the vertical pulse signal Sd having the waveform of the vertical synchronizing signal Vsync in the period between time t1 and time t6 in which the switch signal Sc is at the low level and the waveform of the pulse signal Sq after time t6.

In this way, when the vertical synchronizing signal Vsync or the output from the input port Piv is inputted (time t4) with the switching unit 14 selecting the vertical synchronizing signal Vsync, the vertical synchronizing signal Vsync passes through the switching unit 14 to enter the hold unit 15 as the vertical pulse signal Sd.

When the delayed clock pulse ScK2*d* from the delay unit 12 is outputted to the hold unit 15 at time t3*d*, the hold unit 15 samples and holds the signal Sd composed of the input vertical synchronizing signal Vsync component at the low level and outputs the vertical synchronizing pulse VdR at the low level.

When the clock Hd is outputted from the first frequency divider 4 to the counter 8R at time t6 with the vertical synchronizing pulse VdR at the low level, the count value N is reset to zero. In response to the change of the count value N, the switch signal generator 13 changes the switch signal Sc from the low level to the high level.

Receiving this high-level switch signal Sc, the switching unit 14 selects the high-level pulse signal Sq instead of the low-level vertical synchronizing signal Vsync and outputs it as the vertical pulse signal Sd.

At time t6, the counter 8R is reset and its count value N does not attain Nv+1, and therefore the pulse signal Sq from the pulse generator 9 remains at the high level. This high-level pulse signal Sq is inputted to the hold unit 15 through the switching unit 14.

At time t6d, the delayed clock pulse ScK2*d* from the delay unit 12 is inputted to the hold unit 15, and the hold unit 15 samples and holds the high-level pulse signal Sq and outputs it as the vertical synchronizing pulse VdR.

That is to say, for the vertical synchronizing pulse VdR outputted from the hold unit 15, its vertical synchronization period in which it is at the low level is always constant and equal to twice (H) the period of the delayed clock pulse ScK2*d* (H/2) outputted from the delay unit 12. Also, the phase of the vertical synchronizing pulse VdR is always shifted by the given time δ with respect to the phase of the horizontal synchronizing pulse Hd, which is stable without being affected by the phase shift time τ of the input horizontal synchronizing signal Hsync.

Further, since the counter 8R counts the pulses Hd having the horizontal synchronization period H, its counted value can be ½ of the counted value of the counter 8 used to count the clock pulses having the period of H/2 in the conventional synchronizing signal generator.

Figure 2:
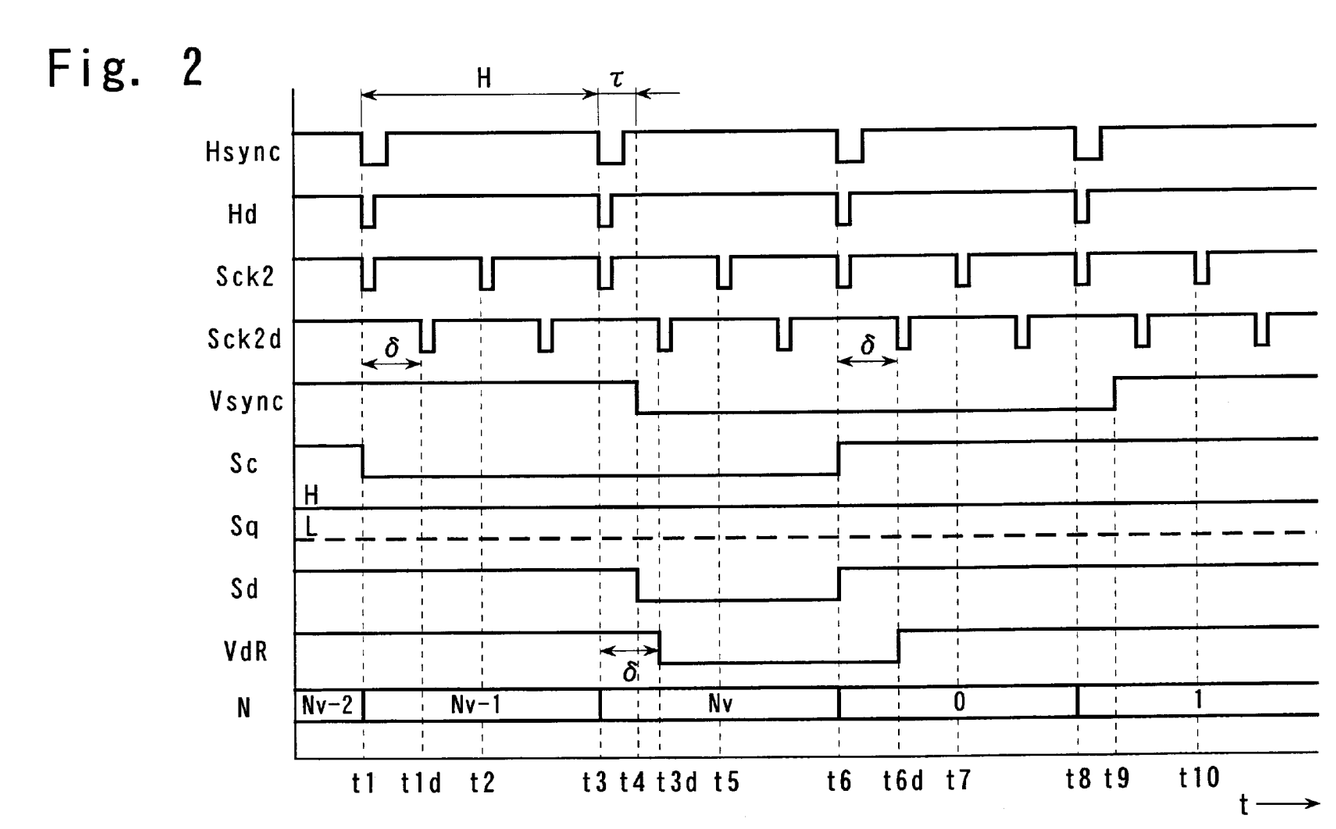
FIG. 2 is a timing chart showing operation of the synchronizing signal generator shown in FIG. 1.

The operation of the synchronizing signal generator of the embodiment of the present invention has been described referring to FIG. 2 for the case in which the vertical synchronizing signal Vsync is inputted with the switching unit 14 selecting the input from the input port Piv.

Figure 3:
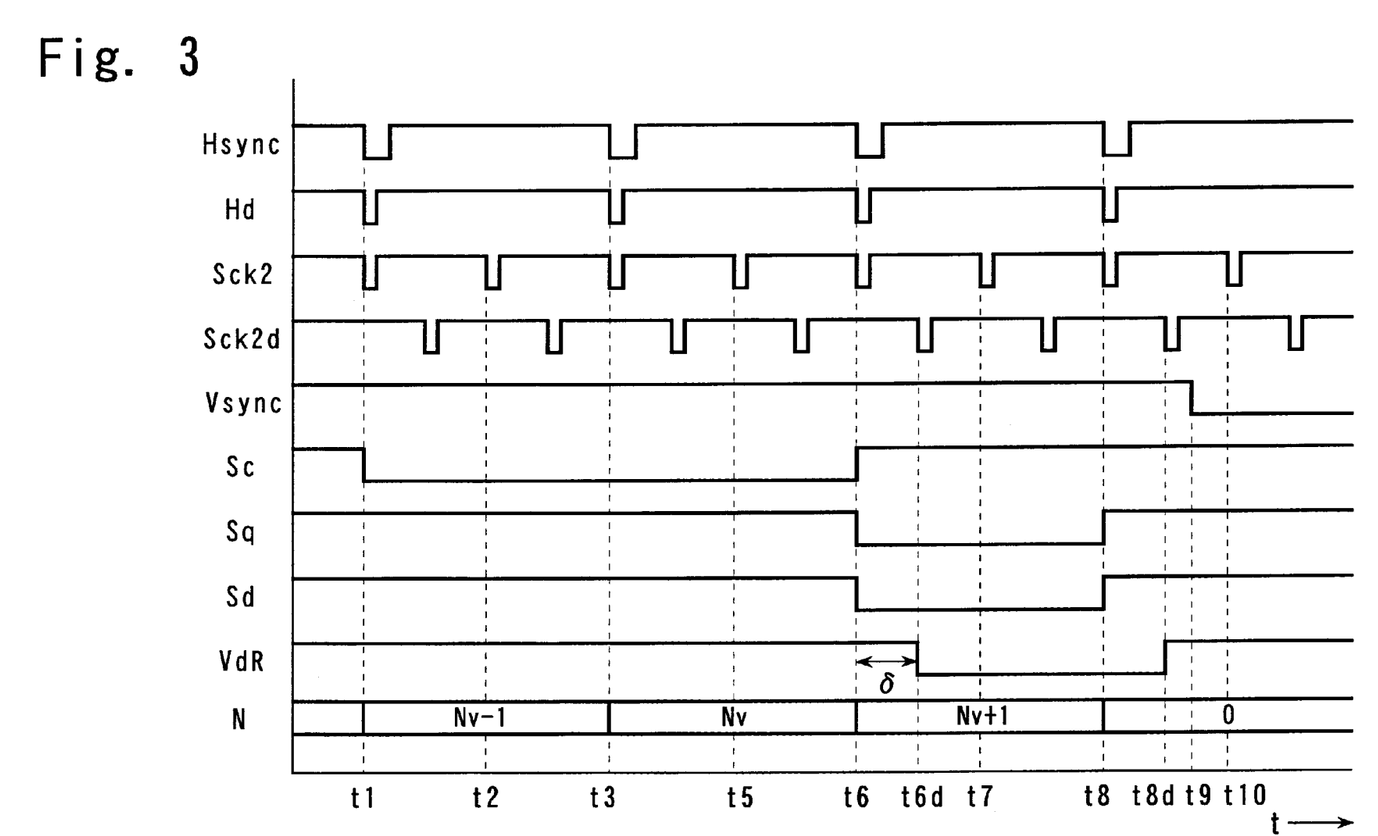
FIG. 3 is another timing chart showing operation of the synchronizing signal generator shown in FIG. 1.

Next, referring to FIG. 3, the operation of the synchronizing signal generator SSGp will be described for the case in which the vertical synchronizing signal Vsync is lost due to noise, switching of channel, and the like and the vertical synchronizing signal Vsync is not inputted in spite of the fact that the switching unit 14 is selecting the output from the input port Piv. In FIG. 3, similarly to those in FIG. 2, the abscissa shows passage of time t and the ordinate shows behaviors of the various signals in the synchronizing signal generator at the time points along the time axis t.

Note that, in the example shown in FIG. 3, the vertical synchronizing signal Vsync is lost on the transmission path, and the synchronizing signal generator SSSp is not supplied with vertical synchronization at time t4 and the absence is solved by time t9. As a result, the vertical synchronizing signal Vsync is not updated at time t4 at which it should originally be updated, but it remains at the high level. Further, at the next updating time t9 at which it should originally be changed from the low level to the high level, the vertical synchronizing signal Vsync is updated from the high level to the low level.

That is to say, in the period in which the count value N of the counter 8R is at Nv−1 and Nv, the switch signal generator 13 outputs the switch signal Sc at the low level. Then, though the switching unit 14 is selecting the output from the input port Piv, the vertical synchronizing signal Vsync is not inputted, and therefore the output signal Sd from the switching unit 14 remains at the high level and the vertical synchronizing pulse VdR or the output from the hold unit 15 is also at the high level, and the counter 8R is not reset.

At time t6, the pulse Hd is provided to the counter 8 and its count value attains Nv+1, and then the pulse generator 9 outputs the pulse signal Sq at the low level, and the output of the switch signal Sc from the switch signal generator 13 is stopped and the switching unit 14 selects the output signal Sq from the pulse generator 9.

Thus the pulse Sq at the low level from the pulse generator 9 is inputted to the hold unit 15 through the switching unit 14. Accordingly, when the delayed clock pulse ScK2*d* from the delay unit 12 is inputted at time t6d, the hold unit 15 outputs the vertical synchronizing pulse VdR at the low level.

When the horizontal synchronizing pulse Hd is inputted from the first frequency divider 4 to the counter 8R at time t8 with the output from the hold unit 15 being at the low level, the count value N is reset. As a result, the output Sq of the pulse generator 9 changes to the high level and this high-level pulse Sq is inputted to the hold unit 15 through the switching unit 14. Then, at time t8d, the delayed clock pulse ScK2d from the delay unit 12 is inputted to the hold unit 15. The hold unit 15 thus outputs the vertical synchronizing pulse VdR at the high level.

In this way, even if the vertical synchronizing signal Vsync is accidentally lost, the vertical synchronizing pulse VdR whose phase is delayed by given time δ with respect to the horizontal synchronizing pulse Hd is certainly generated. Although this vertical synchronizing pulse VdR is delayed after the original vertical synchronization period corresponding to the count value Nv of the counter 8R by one pulse (1H) of the horizontal synchronizing pulse Hd, this delay is a slight value. Further, the delay does not frequently occur. Accordingly it is possible to certainly avoid the trouble of becoming unable to drive the display device.

As described above, the synchronizing signal generator of this invention outputs a vertical synchronizing pulse synchronized with the vertical synchronizing signal only when the input vertical synchronizing signal has a vertical synchronization period of a given range. When the input vertical synchronizing signal does not have a vertical synchronization period of the given range, the synchronizing signal generator of this invention generates a vertical synchronizing pulse having a given vertical synchronization period by itself to keep the input horizontal synchronizing signal and said vertical synchronizing pulse constant in phase. This provides a vertical synchronizing pulse which is stable in phase with respect to the horizontal synchronizing signal, with a counter counting to a small count value.

Industrial Applicability

The present invention can be used in a synchronizing signal generator for generating a stable synchronizing signal at low cost even under an environment in which the synchronizing signal components of the input video signal vary due to effects of the transmission path and switching in video display equipment such as a computer display, a television receiver, and the like.

What is claimed is:

1. A synchronizing signal generator for generating a vertical synchronizing pulse synchronized with a vertical synchronizing signal in an input video signal on the basis of a horizontal synchronizing signal in the input video signal, comprising:

first clock signal generating means for generating a first clock pulse having a period which is 1/n (n is an integer) times that of said horizontal synchronizing signal to generate a first clock signal synchronized with said horizontal synchronizing signal;

counting means for counting said first clock signal to detect a vertical synchronization period of said vertical synchronizing signal;

vertical synchronization period detecting means for detecting a period in which said input vertical synchronizing signal has the vertical synchronization period on the basis of said detected vertical synchronization period;

vertical synchronizing pulse generating means for, when said input vertical synchronizing signal has a vertical synchronization within a first given period range of said detected vertical synchronization period, outputting a vertical synchronizing pulse synchronized with said vertical synchronizing signal, and when said input vertical synchronizing signal does not have a vertical synchronization within said first given period range, generating a vertical synchronizing pulse having a second given vertical synchronization period, said vertical synchronizing pulse generating means comprising, count reset means for resetting the count value of said counting means in accordance with said vertical synchronizing pulse, and switching means for selecting said input vertical synchronizing signal when said count value is larger than one vertical synchronization period by a given value, and selecting said vertical synchronizing pulse in other circumstances;

first frequency dividing means for dividing said first clock pulse to 2/n to generate a second clock pulse having a period equal to ½ of the horizontal synchronization period;

delay means for delaying said second clock pulse to generate a third clock pulse; and holding means for holding the output from said switching means in accordance with said third clock pulse;

wherein said vertical synchronizing pulse is generated by combining said vertical synchronizing signal and said vertical synchronizing pulse in an alternative manner, thereby keeping the input horizontal synchronizing signal and said vertical synchronizing pulse constant in phase.

2. The synchronizing signal generator according to claim 1, wherein said first clock signal generating means comprises, second frequency dividing means for dividing said first clock pulse to 1/n to generate said first clock signal, and phase comparing means for detecting a phase difference between said first clock signal and said horizontal synchronizing signal to control said first clock pulse generating means, and wherein said counting means counts pulses of said first clock signal having the same period as that of said horizontal synchronizing signal.

3. The synchronizing signal generator according to claim 1, further comprising switching control means for controlling the selection made by said switching means between said input vertical synchronizing signal and said vertical synchronizing pulse on the basis of said count value and said vertical synchronizing pulse, wherein said switching control means controls said switching means to select said vertical synchronizing signal in a period from a time at which said horizontal synchronizing signal is inputted with said vertical synchronizing pulse being low to a given time.

4. A synchronizing signal generating method for generating a vertical synchronizing pulse synchronized with a vertical synchronizing signal in an input video signal on the basis of a horizontal synchronizing signal in the input video signal, comprising:

a first clock signal generating step of generating a first clock pulse having a period which is 1/n (n is an integer) times that of said horizontal synchronizing signal to generate a first clock signal synchronized with said horizontal synchronizing signal;

a counting step of counting said first clock signal to detect a vertical synchronization period of said vertical synchronizing signal;

a vertical synchronization period detecting step of detecting a period in which said input vertical synchronizing signal has the vertical synchronization period on the basis of said detected vertical synchronization period;

a vertical synchronizing pulse generating step of, when said input vertical synchronizing signal has a vertical synchronization within a first given period range of said detected vertical synchronization period, outputting a vertical synchronizing pulse synchronized with said vertical synchronizing signal, and when said input vertical synchronizing signal does not have a vertical synchronization within said first given period range, generating a vertical synchronizing pulse having a second given vertical synchronization period, said vertical synchronizing pulse generating step comprising, a count reset step of resetting the count value of said counting step in accordance with said vertical synchronizing pulse, and a switching step of selecting said input vertical synchronizing signal when said count value is larger than one vertical synchronization period by a given value, and selecting said vertical synchronizing pulse in other circumstances;

a first frequency dividing step of dividing said first clock pulse to 2/n to generate a second clock pulse having a period equal to ½ of the horizontal synchronization period;

a delay step of delaying said second clock pulse to generate a third clock pulse; and a holding step of holding the output from said switching step in accordance with said third clock pulse;

wherein said vertical synchronizing pulse is generated by combining said vertical synchronizing signal and said vertical synchronizing pulse in an alternative manner, thereby keeping the input horizontal synchronizing signal and said vertical synchronizing pulse constant in phase.

5. The synchronizing signal generating method according to claim 4, wherein said first clock signal generating step comprises, a second frequency dividing step of dividing said first clock pulse to 1/n to generate said first clock signal, and a phase comparing step of detecting a phase difference between said first clock signal and said horizontal synchronizing signal, and wherein said first clock pulse generating step generates said first clock pulse on the basis of said detected phase difference, and said counting step counts pulses of said first clock signal having the same period as that of said horizontal synchronizing signal.

6. The synchronizing signal generating method according to claim 4, further comprising a switching control step of controlling the selection made in said switching step between said input vertical synchronizing signal and said vertical synchronizing pulse on the basis of said count value and said vertical synchronizing pulse, wherein said switching control step controls the switching to select said vertical synchronizing signal in a period from a time at which said horizontal synchronizing signal is inputted with said vertical synchronizing pulse being low to a given time.

* * * * *